(12) United States Patent
Tsai et al.

(10) Patent No.: US 10,343,748 B2
(45) Date of Patent: Jul. 9, 2019

(54) ELECTRONIC REAR DERAILLEUR FOR BICYCLE

(71) Applicant: TH INDUSTRIES CO., LTD., Taichung (TW)

(72) Inventors: Vince Tsai, Taichung (TW); Alfredo Sala, Taichung (TW)

(73) Assignee: TH INDUSTRIES CO., LTD., Taichung (TW)

( * ) Notice: Subject to any disclaimer, the term of this patent is extended or adjusted under 35 U.S.C. 154(b) by 230 days.

(21) Appl. No.: 15/654,683

(22) Filed: Jul. 19, 2017

(65) Prior Publication Data

US 2019/0023351 A1 Jan. 24, 2019

(51) Int. Cl.
*B62M 9/122* (2010.01)
*B62M 9/1244* (2010.01)
*B62M 9/124* (2010.01)
*B62M 9/00* (2006.01)

(52) U.S. Cl.
CPC ............ *B62M 9/122* (2013.01); *B62M 9/124* (2013.01); *B62M 9/1244* (2013.01); *B62M 2009/005* (2013.01)

(58) Field of Classification Search
CPC ............ B62M 9/122; B62M 9/124; B62M 2009/12406; B62M 2009/12413; B62M 25/08
USPC .......................................................... 474/80
See application file for complete search history.

(56) References Cited

U.S. PATENT DOCUMENTS

| 3,863,512 A * | 2/1975 | Crawley | B62M 9/122 474/110 |
| 4,041,788 A * | 8/1977 | Nininger, Jr. | B62M 9/122 474/110 |
| 4,469,479 A * | 9/1984 | Ozaki | B62M 9/1244 474/80 |
| 4,601,682 A * | 7/1986 | Nagano | B62M 9/127 474/78 |
| 7,549,662 B2 * | 6/2009 | Righi | B62M 9/122 280/257 |
| 9,334,017 B2 * | 5/2016 | Sala | B62M 9/124 |
| 9,656,723 B1 * | 5/2017 | Tachibana | B62M 9/122 |
| 2002/0187867 A1 * | 12/2002 | Ichida | B62K 23/06 474/82 |
| 2007/0216130 A1 * | 9/2007 | Righi | B62M 9/122 280/210 |
| 2008/0227572 A1 * | 9/2008 | Sakaue | B62M 9/122 474/82 |
| 2009/0210118 A1 * | 8/2009 | Takamoto | B62M 9/122 701/49 |

(Continued)

*Primary Examiner* — Henry Y Liu

(57) ABSTRACT

An electronic rear derailleur includes a driving unit, a gearbox, a base portion, and a derailleur portion. The gearbox includes a biasing member, a first power gear, a second power gear, a first passive gear, and a second passive gear. The first power gear connects with the driving unit. Force is transmitted from the first power gear to the second power gear through the biasing member. The second power gear meshes the first passive gear and the second passive gear. The first passive gear and the second passive gear are respectively used to allow relative rotation between the gearbox and the derailleur portion with respect to the base portion, whereby the chain of a bicycle can be moved to engage with different sprockets to achieve the purpose of shifting.

8 Claims, 7 Drawing Sheets

(56) References Cited

U.S. PATENT DOCUMENTS

| | | | |
|---|---|---|---|
| 2009/0215561 A1* | 8/2009 | Fukuda | B62M 9/122 474/82 |
| 2009/0240858 A1* | 9/2009 | Takebayashi | B62M 25/08 710/110 |
| 2012/0149509 A1* | 6/2012 | Capogna | B62M 9/122 474/80 |
| 2014/0087901 A1* | 3/2014 | Shipman | B62M 9/132 474/82 |
| 2015/0111675 A1* | 4/2015 | Shipman | B62M 9/122 474/82 |
| 2015/0259031 A1* | 9/2015 | Sala | B62M 9/122 474/80 |
| 2016/0152301 A1* | 6/2016 | Bortoli | B62M 9/132 474/82 |
| 2016/0152303 A1* | 6/2016 | Bortoli | B62M 25/08 701/51 |
| 2016/0375959 A1* | 12/2016 | Calendrille, Jr. | B62M 9/1242 474/122 |
| 2017/0066501 A1* | 3/2017 | Hilgenberg | B62M 9/122 |
| 2017/0166281 A1* | 6/2017 | Tachibana | B62M 9/122 |
| 2017/0197685 A1* | 7/2017 | Braedt | B62M 9/122 |
| 2017/0320541 A1* | 11/2017 | Pasqua | B62M 9/122 |
| 2017/0334519 A1* | 11/2017 | Sala | B62M 9/132 |
| 2017/0343063 A1* | 11/2017 | Chan | B62M 9/124 |
| 2018/0237104 A1* | 8/2018 | Pasqua | B62M 9/1242 |
| 2018/0244345 A1* | 8/2018 | Yamaguchi | B62M 9/1244 |
| 2018/0274623 A1* | 9/2018 | Brown | B62M 9/128 |
| 2018/0354586 A1* | 12/2018 | Komatsu | B62M 9/1242 |

* cited by examiner

ELECTRONIC REAR DERAILLEUR FOR BICYCLE

FIELD OF THE INVENTION

The present disclosure relates to rear derailleur, and more particularly to an electronic rear derailleur for bicycle.

BACKGROUND OF THE INVENTION

Exercise for being healthy is now a national activity. Riding bicycle bike is one of those popular exercises. Compare to other exercises, riding bicycle can not only keep the shape of our bodies, but also can broaden our horizons while traveling.

Bicycles have several sprockets in different diameters for different terrain and different slope. The bicycle moves its chain to mesh different sprockets so that the bicycle can shift to output a torque in an appropriate mode so as to ride easily in various terrains.

When the chain is moved to mesh different sprockets, a derailleur is needed. Typical derailleur is operated in a mechanical way to move the chain. However, riding bicycle is not just a sport, it became a fashion activity recently. Therefore, to upgrade the riding experiences, electronic derailleur offers an ideal style to stay fashion and healthy.

Transmit the power of the motor by a gear set in some circumstances the derailleur would be impacted or polluted by sand or dust. Then the gear set within the derailleur may wear or collapse in the gear teeth, which may cause the imprecise or unable movement of derailleur or damage of the motor.

SUMMARY OF THE INVENTION

The present disclosure provides a rear electronic derailleur for a bicycle, which is strong and light-weighted to release inappropriate stress so as to prevent damage of gears and to smooth shifting operation so as to provide riding fun.

An embodiment of the rear electronic derailleur of the present disclosure moves the chain to mesh one of several sprockets of a bicycle. The sprockets are concentrically mounted to a frame of the bicycle. The rear electronic derailleur of the present disclosure includes a gear box, a base portion and a derailleur portion.

The gear box includes a box body, a first power gear, a second power gear, at least one biasing member, a first passive gear and a second passive gear. The first power gear, the second power gear, the biasing member, the first passive gear and the second passive gear are disposed within the box body. The first power gear is connected to the driving unit and detachably connected to the second power gear to transmit power. The biasing member includes a first end and a second end, the first end is disposed in one of the first power gear and the second power gear, and the second end is detachably engaged with another one of the first power gear and the second power gear, and the second power gear meshes the first passive gear and the second passive gear.

In another embodiment, the driving unit includes a motor and a transmission mechanism joined to an output shaft of the motor, the transmission mechanism is connected to the first power gear to rotate the first power gear so as to move the gear box and the derailleur portion with respect to the base portion.

In another embodiment, the box body has a first through hole and a second through hole, the base portion is disposed on one side of the first through hole, the first passive gear is connected to another side of the first through hole through a first shaft, the derailleur portion is disposed on one side of the second through hole, and the second passive gear is connected to another side of the second through hole through a second shaft.

In another embodiment, the first passive gear and the second passive gear are sector gears.

In another embodiment, the first end of the biasing member is fixed to the first power gear and the second end of the biasing member is detachably engaged with the second power gear.

In another embodiment, the biasing member includes a fixing portion, a biasing portion and an engaging portion, the first power gear includes at least one positioning hole corresponding to the at least one biasing member, the second power gear includes a gear portion and a linking portion including a plurality of linking grooves, the gear portion and the linking portion are joined concentrically, the fixing portion is fixed to the positioning hole, the biasing portion extends from the fixing portion, and the engaging portion detachably engages with one of the linking grooves.

In another embodiment, the linking portion and the gear portion are integrally formed.

In another embodiment, the derailleur portion includes at least one pulley meshing the chain.

The electronic rear derailleur of the present disclosure utilizes the biasing member connecting the first power gear and the second power gear to transmit power therebetween to release inappropriate stress and prevent damage of gears. Since the first passive gear and the second passive gear are sector gears, the structure is strong but light-weighted. The structure is joined to the driving unit to ensure smooth shifting and provide more riding fun.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
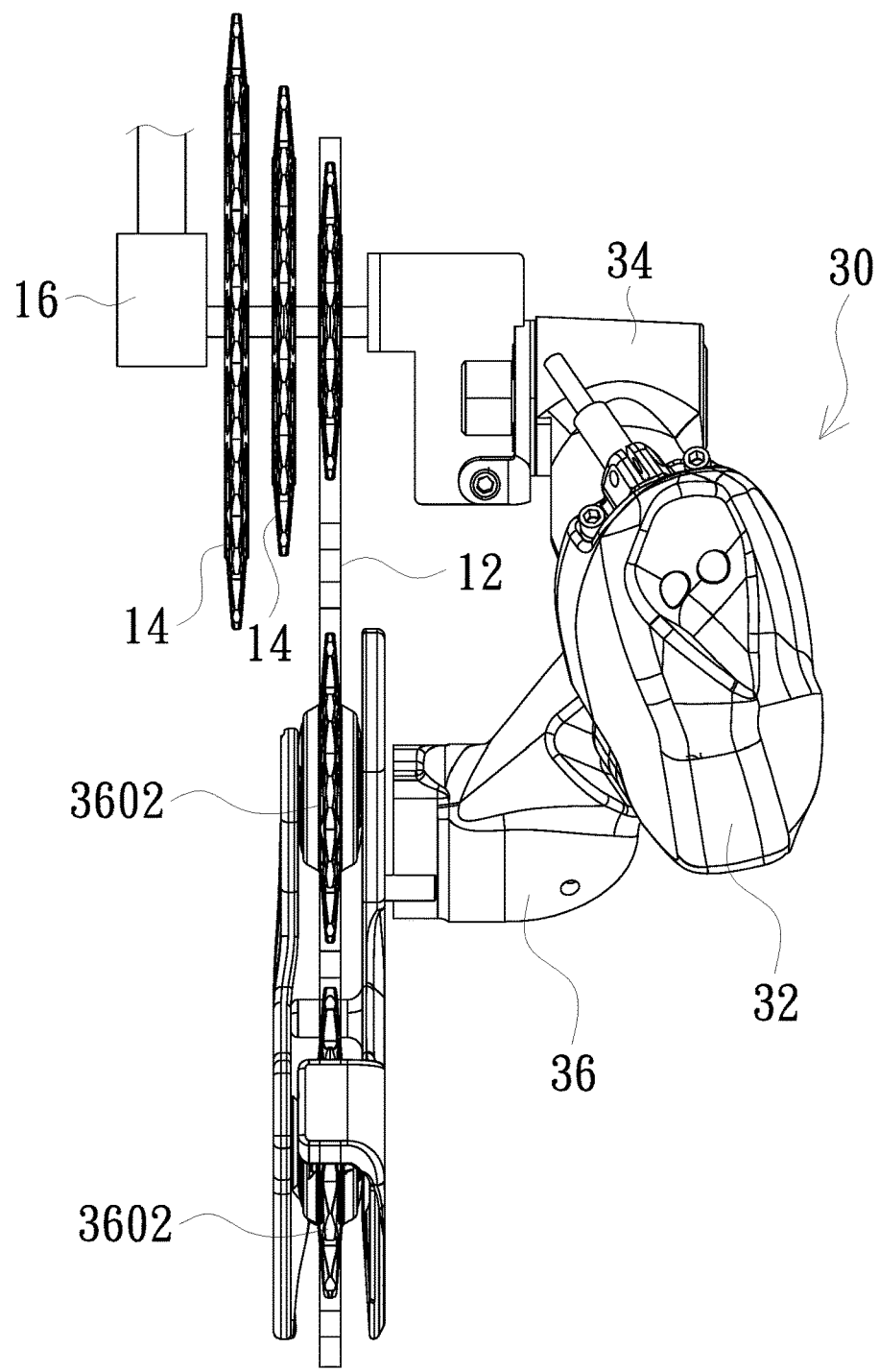
FIG. 1 is a schematic diagram of an electronic rear derailleur of the present disclosure and sprockets of a bicycle.

The present disclosure relates to an electronic rear derailleur 30 for a bicycle. Referring to FIG. 1, FIG. 1 is a schematic diagram of an electronic rear derailleur 30 of the present disclosure and a sprocket 14 of a bicycle. FIG. 1 illustrates that the electronic rear derailleur 30 and the sprockets 14 are viewed from rear side of a bicycle. The electronic rear derailleur 30 is configured to move a chain 12 of the bicycle so as to change the mesh of the chain 12 and one of the sprockets 14. The sprockets 14 are concentrically fixed to a frame 16 of the bicycle. The electronic rear derailleur 30 includes a gear box 32, a base portion 34 and a derailleur portion 36.

The gear box 32 is movably connected to the base portion 34 and the derailleur portion 36. The base portion 34 is fixed to the frame 16 and extends as another end of output shaft of the sprockets 14. The derailleur portion 36 has at least one pulley 3602. The pulley 3602 is near the sprocket 14 and meshes the chain 12. The derailleur portion 36 contacts the chain 12 through the pulley 3602. FIG. 1 illustrates two pulleys 3602.

Figure 2:
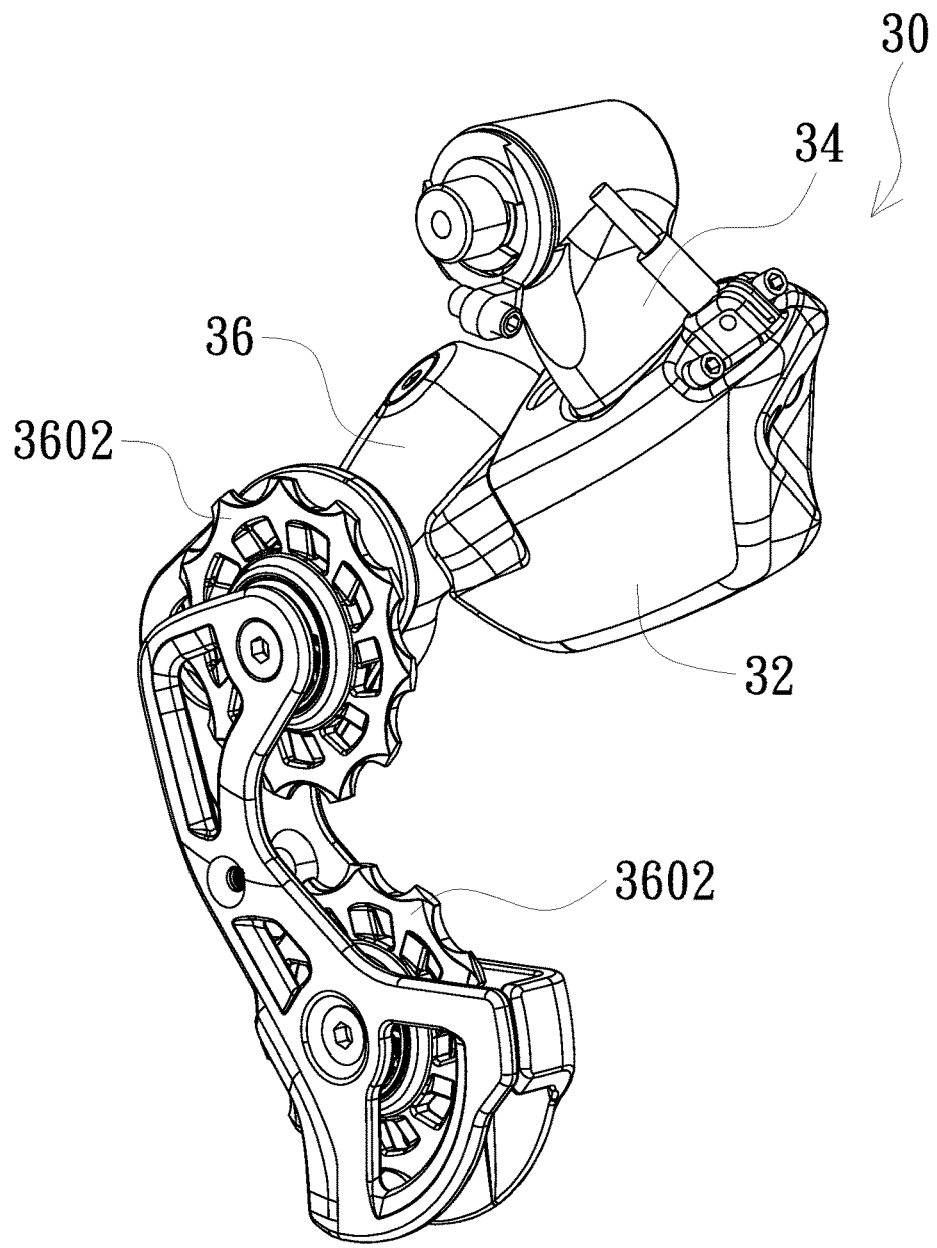
FIG. 2 is a schematic diagram of an electronic rear derailleur of the present disclosure.

Referring to FIG. 2, FIG. 2 is a schematic diagram of an electronic rear derailleur of the present disclosure. The base portion 34 and the derailleur portion 36 are connected to the gear box 32 in two different positions. The derailleur portion 36 has two pulleys 3602. The gear box 32 has a driving unit and a plurality of meshed gears. The gear box 32 drives the derailleur portion 36 to rotate with respect to the movable position that connected to the gear box 32, and moves the pulleys 3602 so as to move the chain 12 and to mesh different sprockets 14.

Figure 3A:
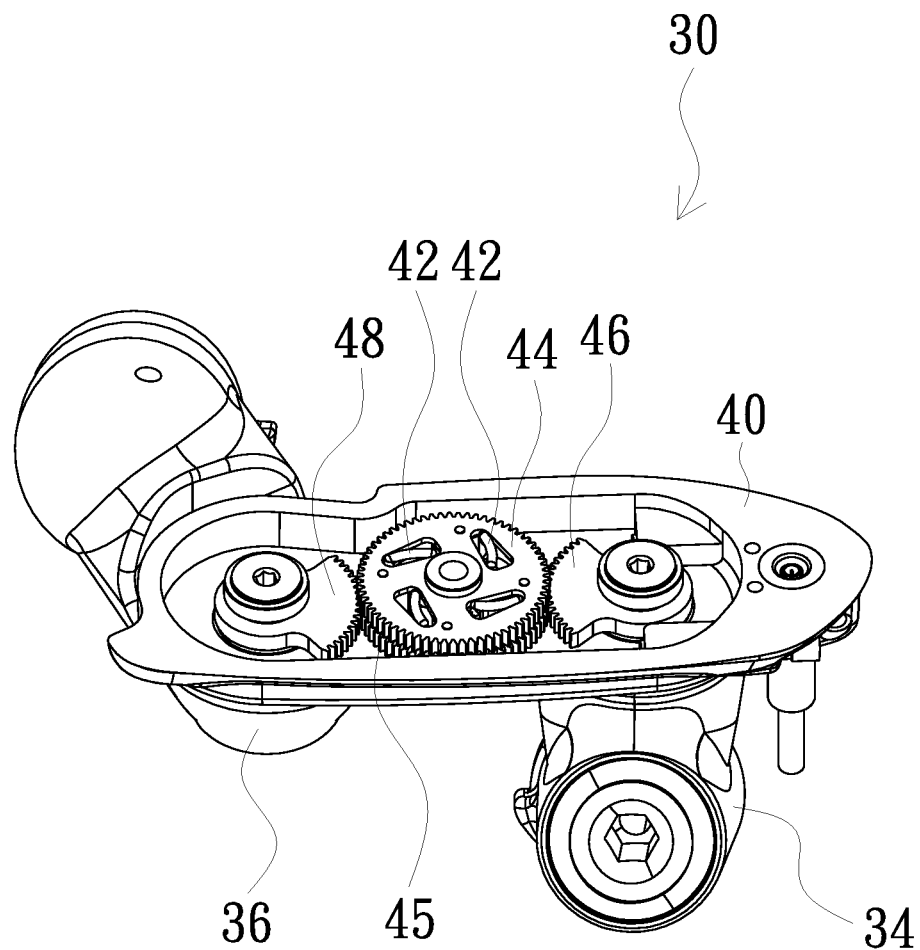
FIG. 3A is schematic diagram of a portion of gears of a gear box of the present disclosure.
Figure 3B:
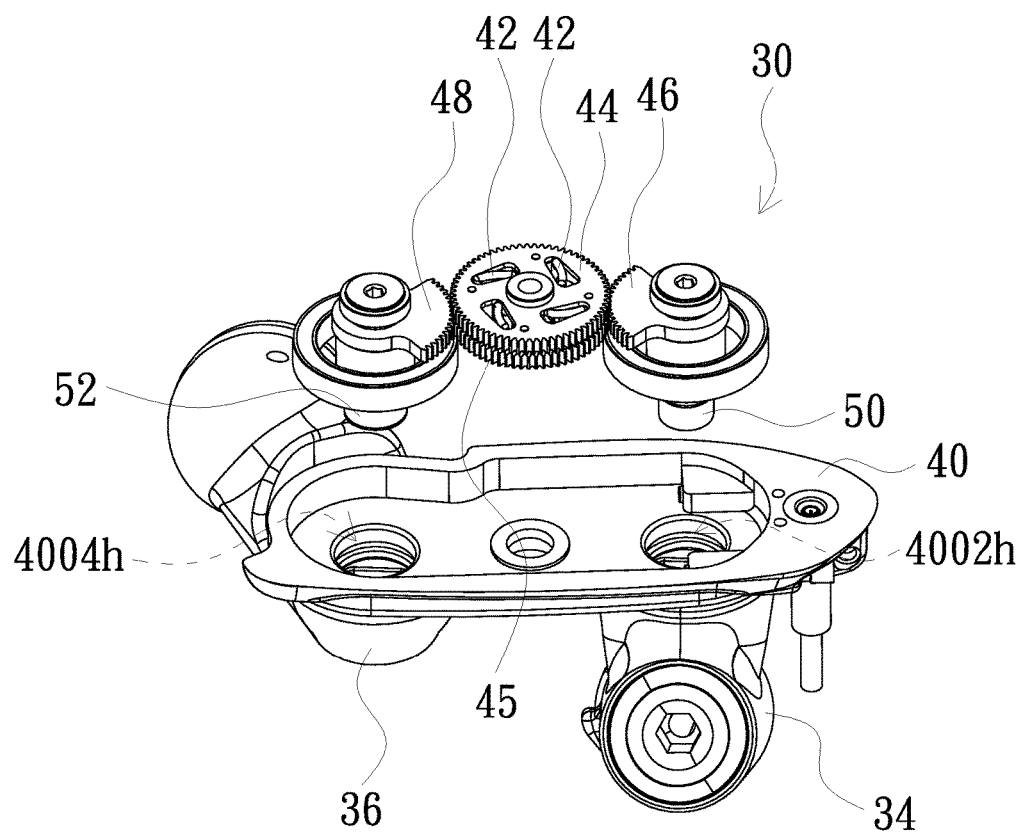
FIG. 3B is an exploded diagram of FIG. 3A.

Referring to FIGS. 3A and 3B, FIG. 3A is a schematic diagram of partial gears of the gear box 32, and FIG. 3B is an exploded diagram of FIG. 3A. The gears in the gear box 32 are related to the driving unit and driving unit itself is eliminated in FIGS. 3A and 3B. In such a condition, the gear box 32 includes a box body 40, at least one biasing member 42, a first power gear 44, a second power gear 45, a first passive gear 46 and a second passive gear 48.

The biasing member 42, the first power gear 44, the second power gear 45, the first passive gear 46 and the second passive gear 48 are all disposed in the box body 40. The first power gear 44 is connected to the driving unit. The biasing member 42 has a first end which fixed to either the first power gear 44 or the second power gear 45, and the biasing member 42 also has a second end which is detachably engaged with another one of the first power gear 44 or the second power gear 45. The first power gear 44 transfers power to the second power gear 45 through the biasing member 42.

The first passive 46 meshes one side of the second power gear 45, and the second passive gear 48 meshes another side of the second power gear 45. As illustrated in FIG. 3B, the box body 40 includes a first through hole 4002h and a second through hole 4004h. The first through hole 4002h corresponds to the first passive gear 46, and the second through hole 4004h corresponds to the second passive gear 48. Preferably, the first passive gear 46 and the second passive gear 48 are sector gears, which reduce weight but can provide the same function.

As illustrated in FIGS. 1 and 2, the base portion 34 is fixed to a frame 16 and coupling with the first through hole 4002h, so as to the gear box 32 can rotates with respect to the base portion 34. Referring to FIGS. 3B, the base portion 34 includes a first shaft 50 connected to the first passive gear 46. The derailleur portion 36 is configured to contact the chain 12 and pivoted to the second through hole 4004h, and having a second shaft 52 connected to the second passive gear 48. The derailleur portion 36 is rotatable with respect to the gear box 32.

When the first power gear 44 rotates, the second power gear 45 is rotated by the biasing member 42, which connect with the first power gear 44 on one side and with the second power gear 45 on the other side. The rotating second power gear 45 then makes the first passive gear 46 and the second passive gear 48 rotate simultaneously, and further rotate the base portion 34 and the derailleur portion 36 at the same time. Since the base portion 34 is fixed to the frame 16, the movements of the base portion 34 and the derailleur portion 36 are in different directions that can control the pulley 3602 to move the chain 12 to an appropriate position with respect to the sprocket 14.

Figure 4A:
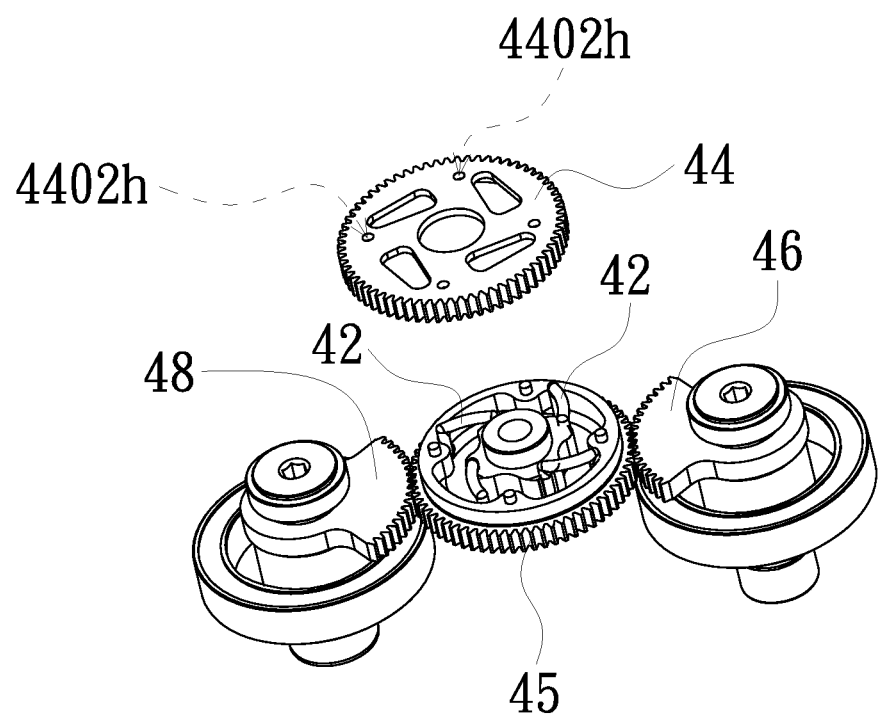
FIG. 4A is a schematic diagram of a biasing member and power gears of the present disclosure.
Figure 4B:
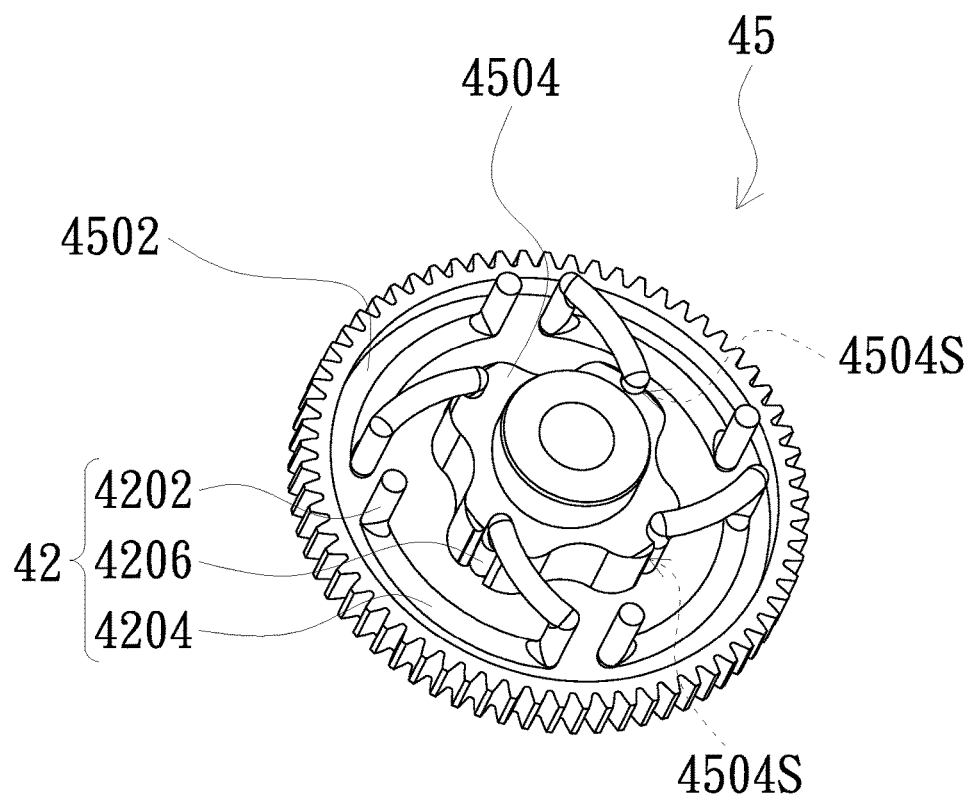
FIG. 4B is an enlarged diagram of a biasing member and a second power gear.

Referring to FIGS. 4A and 4B, FIG. 4A is a schematic diagram of a biasing member and power gears of the present disclosure, and FIG. 4B is an enlarged diagram of a biasing member and a second power gear. The first power gear 44 corresponds to the biasing member 42 and has at least one positioning hole 4402h. Four biasing members 42 and four positioning holes 4402h are illustrated in FIGS. 4A and 4B. The second power gear 45 includes a gear portion 4502 and a linking portion 4504. The gear portion 4502 and the linking portion 4504 are joined concentrically. The linking portion 4504 has a plurality of grooves 4504S. The gear portion 4502 meshes the first passive gear 46 and the second passive gear 48. The biasing member 42 includes a fixing portion 4202, a biasing portion 4204 and an engaging portion 4206. The first end of the biasing member 42 is the fixing portion 4202, and the second end of the biasing member 42 is the engaging portion 4206. The biasing member 42 is fixed to the first power gear 44 through the fixing portion 4202, and the biasing member 42 is detachably engaged with the second power gear 45 through the engaging portion 4206.

The fixing portion 4202 is inserted into the positioning hole 4402h. The biasing portion 4204 extends from the fixing portion 4202, and the engaging portion 4206 extends from the biasing portion 4204. It is illustrated that the biasing portion 4204 has four turning points from the fixing portion 4202 to the engaging portion 4206. Multiple turning points provide sufficient length and elastic effect for releasing the concentrated stress. The engaging portion 4206 is engaged with one of the grooves 4504S. When the biasing member 42 sustains an instant stress which is greater than a biasing force the biasing member 42 can endure, the engaging portion 4206 will disengage from the groove 4504S and move along an outer edge of the linking portion 4504 to a next groove 4504S, whereby the stress is released without damage any gears.

Figure 5:
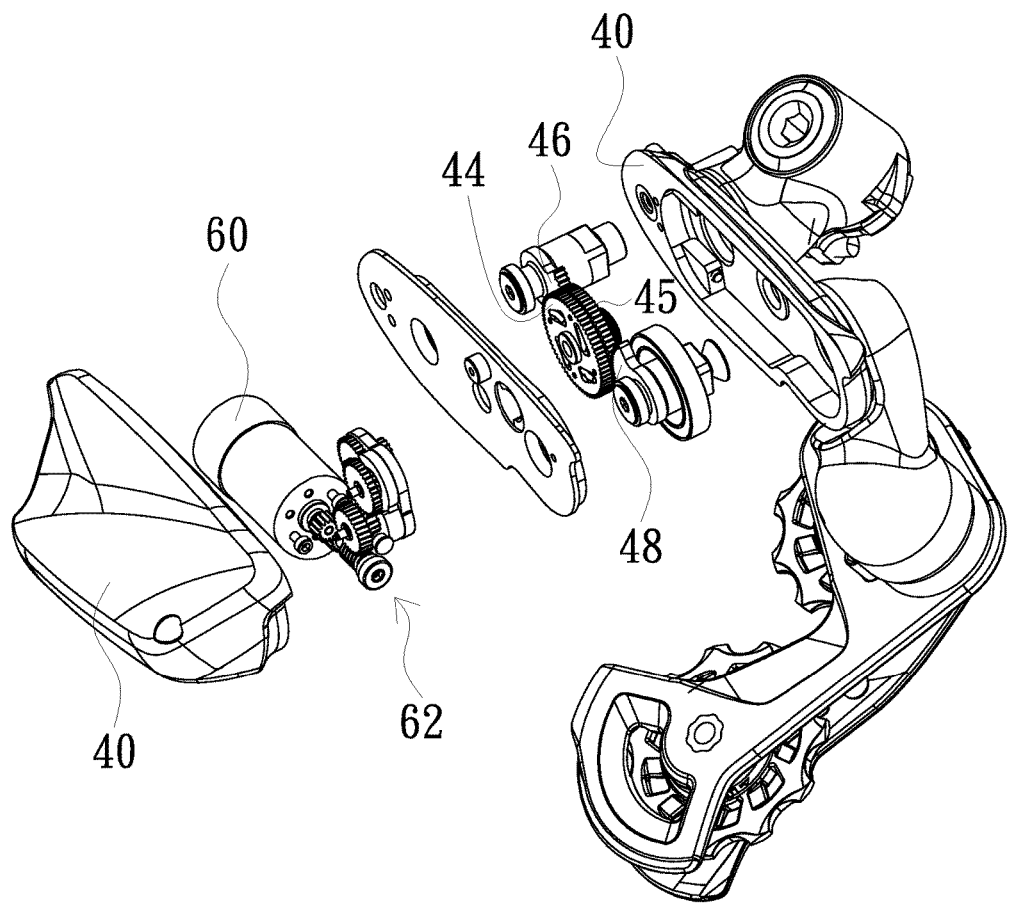
FIG. 5 is a schematic diagram of a driving unit of the invention.

Referring to FIG. 5, FIG. 5 is a schematic diagram of a driving unit of the present disclosure. The driving unit of the present disclosure is a motor 60. The gear box 32 further includes a motor 60 and a transmission mechanism 62. The motor 60 and the transmission mechanism 62 are disposed in the box body 40. The motor 60 generates power through electrical power which can be provided by a battery. The motor 60 has an output shaft connected to the transmission mechanism 62, and the transmission mechanism 62 is connected to the first power gear 44.

The transmission mechanism 62 can be various types. It is illustrated that the transmission mechanism 62 includes a worm, a worm gear and several gears. The transmission mechanism 62 is configured to transmit power that generated by the motor 60 to the first power gear 44 effectively in a small space. In another embodiment, the linking portion 4504 and the gear portion 4502 are integrally formed.

The present disclosure provides an electronic rear derailleur 30. The biasing member 42 connects the first power gear 44 and the second power gear 45 to transmit power, and the inappropriate stress is released to prevent damage of gear. The first passive gear 46 and the second passive gear 48 are sector gears which provide a stable and light-weighted structure. This structure is joined with the driving unit to ensure smooth shifting.

While the present disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic rear derailleur for a bicycle comprising a frame and a chain, comprising:
    a base portion fixed to the frame;
    a derailleur portion configured to contact the chain;
    a gear box, comprising a box body, a first power gear, a second power gear, at least one biasing member, a first passive gear and a second passive gear;
    wherein the first power gear is detachably connected to the second power gear, the biasing member comprises a first end and a second end, the first end is disposed in one of the first power gear and the second power gear, and the second end is detachably engaged with another one of the first power gear and the second power gear, the second power gear meshes the first passive gear and the second passive gear; and
    a driving unit connected to the first power gear to drive the first power gear and the second power gear.

2. The electronic rear derailleur according to claim 1, wherein the driving unit comprises a motor and a transmission mechanism joined to an output shaft of the motor, the transmission mechanism is connected to the first power gear to rotate the first power gear so as to move the gear box and the derailleur portion with respect to the base portion.

3. The electronic rear derailleur according to claim 1, wherein the box body has a first through hole and a second through hole, the base portion is disposed on one side of the first through hole, the first passive gear is connected to another side of the first through hole through a first shaft, the derailleur portion is disposed on one side of the second through hole, and the second passive gear is connected to another side of the second through hole through a second shaft.

4. The electronic rear derailleur according to claim 1, wherein the first passive gear and the second passive gear are sector gears.

5. The electronic rear derailleur according to claim 1, wherein the first end of the biasing member is fixed to the first power gear, and the second end of the biasing member is detachably joined to the second power gear.

6. The electronic rear derailleur according to claim 5, wherein the biasing member comprises a fixing portion, a biasing portion and an engaging portion; the first power gear comprises at least one positioning hole corresponding to the at least one biasing member; the second power gear comprises a gear portion and a linking portion, the linking portion comprises a plurality of linking grooves; wherein, the gear portion and the linking portion are joined concentrically, the fixing portion is fixed to the positioning hole, the biasing portion extends from the fixing portion, and the engaging portion is detachably engaged with one of the linking grooves.

7. The electronic rear derailleur according to claim 6, wherein the linking portion and the gear portion are integrally formed.

8. The electronic rear derailleur according to claim 1, wherein the derailleur portion comprises at least one pulley meshing the chain.

* * * * *